(12) United States Patent
Kobes et al.

(10) Patent No.: US 10,020,706 B2
(45) Date of Patent: Jul. 10, 2018

(54) ELECTRIC MACHINE WITH A COOLING DEVICE, AND METHOD FOR PRODUCING SAID MACHINE

(71) Applicant: Schaeffler Technologies AG & Co. KG, Herzogenaurach (DE)

(72) Inventors: Michael Kobes, Hoechstadt a.d. Aisch (DE); Maria Holland, Buehlertal (DE); Achim Weber, Baden-Baden (DE); Wolfgang Hill, Karlsruhe (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 100 days.

(21) Appl. No.: 14/764,482

(22) PCT Filed: Jan. 16, 2014

(86) PCT No.: PCT/DE2014/200002
§ 371 (c)(1),
(2) Date: Jul. 29, 2015

(87) PCT Pub. No.: WO2014/117773
PCT Pub. Date: Aug. 7, 2014

(65) Prior Publication Data
US 2015/0381010 A1 Dec. 31, 2015

(30) Foreign Application Priority Data
Feb. 4, 2013 (DE) .................. 10 2013 201 758

(51) Int. Cl.
*H02K 5/20* (2006.01)
*H02K 9/19* (2006.01)
(Continued)

(52) U.S. Cl.
CPC ................ *H02K 5/20* (2013.01); *H02K 1/04* (2013.01); *H02K 15/02* (2013.01); *H02K 9/19* (2013.01)

(58) Field of Classification Search
CPC ........... H02K 5/20; H02K 15/02; H02K 9/19; H02K 9/00; H02K 9/005; H02K 9/193;
(Continued)

(56) References Cited

U.S. PATENT DOCUMENTS

| 1,678,380 A | 7/1928 | Reed et al. |
| 3,009,072 A | 11/1961 | Mossay |

(Continued)

FOREIGN PATENT DOCUMENTS

| CN | 101944799 | 1/2011 |
| CN | 102906972 | 1/2013 |

(Continued)

OTHER PUBLICATIONS

Zircon definition from Dictionary.com.*
DE 102014112223 A1 's English Machine Translation.*

*Primary Examiner* — Thomas Truong
(74) *Attorney, Agent, or Firm* — Davidson, Davidson & Kappel, LLC

(57) ABSTRACT

An electric machine (1) and to a method for producing the machine (1), including a housing (2) and a stator (3) accommodated therein, as well as at least one rotor (4) arranged radially inside the stator (3), a plastic body (7) that at least radially surrounds the outside of a soft-magnetic core (5) of the stator (3), and a cooling device (10) located between the stator (3) and the housing (2) is provided. In order to improve the cooling device (10), at least one recess (11) that conveys a cooling medium is created between the housing (2) and the stator (3) at least partially in the outer circumferential surface of the plastic body (7).

8 Claims, 1 Drawing Sheet

(51) Int. Cl.
*H02K 1/04* (2006.01)
*H02K 15/02* (2006.01)

(58) Field of Classification Search
CPC ........... H02K 9/197; H02K 9/06; H02K 9/22; H02K 9/04; H02K 5/08; H02K 5/02
USPC .................... 310/52, 57, 58, 60 A, 60 R, 54
See application file for complete search history.

(56) References Cited

U.S. PATENT DOCUMENTS

| | | | | |
|---|---|---|---|---|
| 3,567,975 | A * | 3/1971 | Biesack | H02K 9/19 |
| | | | | 310/54 |
| 4,749,921 | A * | 6/1988 | Chitayat | H02K 41/031 |
| | | | | 310/12.24 |
| 5,459,190 | A * | 10/1995 | Nakamura | C08K 3/34 |
| | | | | 264/328.1 |
| 6,909,210 | B1 * | 6/2005 | Bostwick | H02K 5/20 |
| | | | | 310/254.1 |
| 9,518,477 | B2 | 12/2016 | Karlsson et al. | |
| 2002/0135245 | A1 * | 9/2002 | Derleth | H02K 9/22 |
| | | | | 310/64 |
| 2004/0124720 | A1 | 7/2004 | Condamin et al. | |
| 2008/0018180 | A1 * | 1/2008 | Neal | H02K 9/20 |
| | | | | 310/54 |
| 2008/0042498 | A1 * | 2/2008 | Beer | H02K 1/20 |
| | | | | 310/400 |
| 2008/0185924 | A1 * | 8/2008 | Masoudipour | H02K 5/20 |
| | | | | 310/54 |
| 2009/0026857 | A1 | 1/2009 | Lavall | |
| 2009/0127946 | A1 * | 5/2009 | Fee | H02K 5/20 |
| | | | | 310/64 |
| 2009/0212649 | A1 | 8/2009 | Kingman et al. | |
| 2010/0001597 | A1 | 1/2010 | Noll | |
| 2011/0101802 | A1 | 5/2011 | Hennings et al. | |
| 2011/0181130 | A1 * | 7/2011 | Yoshida | H02K 41/031 |
| | | | | 310/12.29 |
| 2013/0278088 | A1 * | 10/2013 | Bahr | H02K 9/00 |
| | | | | 310/52 |

FOREIGN PATENT DOCUMENTS

| | | | | |
|---|---|---|---|---|
| DE | | 1613396 | A1 | 12/1971 |
| DE | | 1728181 | A1 | 2/1972 |
| DE | | 4411055 | A1 | 8/1998 |
| DE | | 101 22 425 | A1 | 11/2002 |
| DE | | 102005052363 | | 5/2007 |
| DE | | 102005052364 | A1 | 5/2007 |
| DE | | 102007060011 | | 7/2009 |
| DE | | 102009051881 | A1 | 5/2011 |
| DE | | 102011076532 | | 11/2012 |
| DE | | 102014112223 | A1 * | 3/2016 ............... H02K 5/20 |

\* cited by examiner

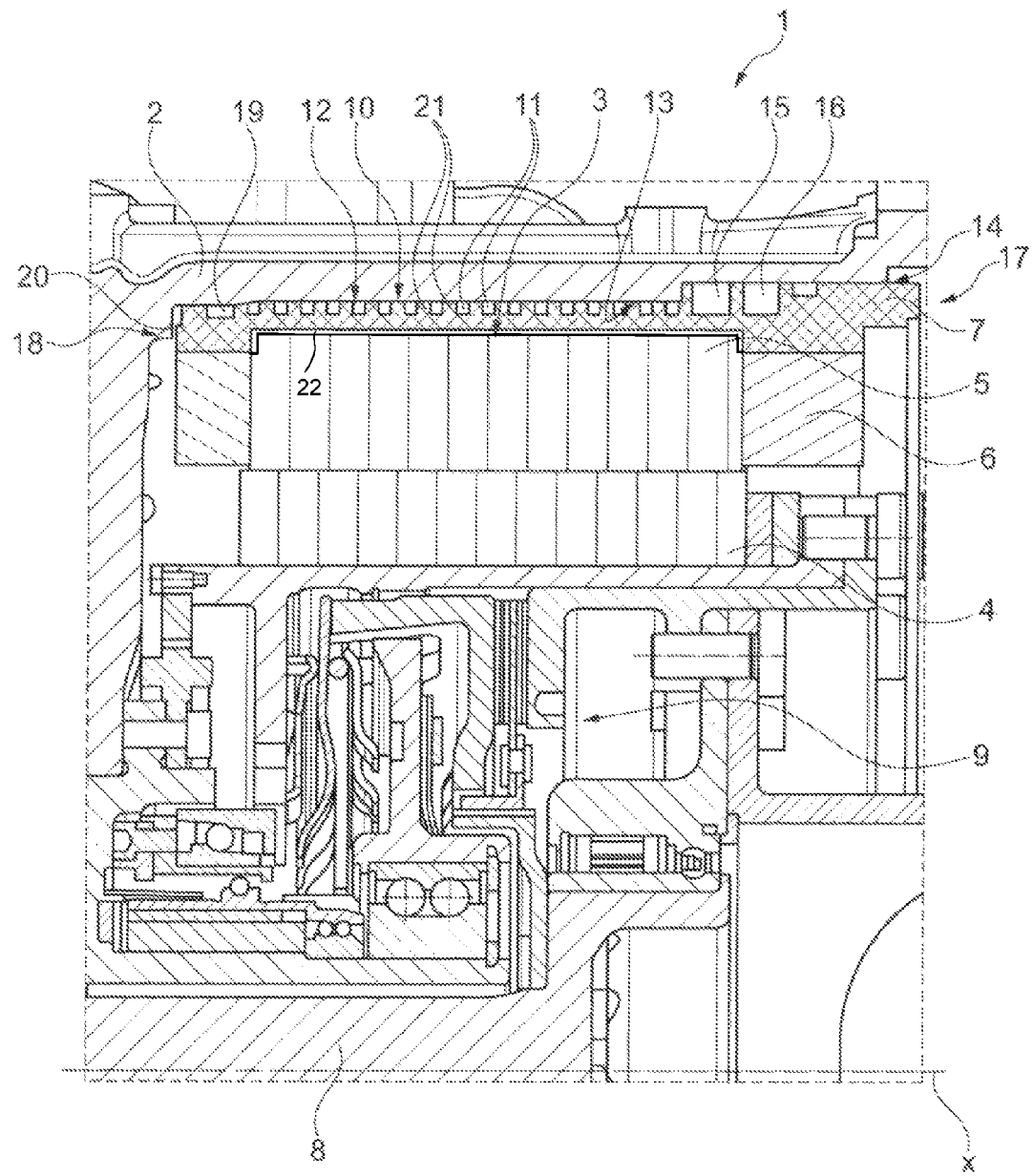

ELECTRIC MACHINE WITH A COOLING DEVICE, AND METHOD FOR PRODUCING SAID MACHINE

The invention relates to an electric machine and to a method for producing said machine, comprising a housing and a stator accommodated therein, as well as at least one rotor arranged radially inside the stator, also a plastic body that at least radially surrounds the outside of a soft-magnetic core of the stator, and a cooling device between the stator and the housing.

BACKGROUND

In certain designs, electric machines in the form of electric motors and/or power generators, for example, in drives of motor vehicles, have a stator with a soft-magnetic core and, wound in them or between them, they have windings made of copper wire or copper rods as well as a rotor that is arranged rotatably therein. When the windings are energized, in addition to converting electric energy into mechanical energy and vice versa, they generate thermal energy which, as a thermal load, leads to a temperature rise in the components, and this can cause damage to the electric machine and lead to a reduction in its efficiency. Particularly with hybrid drives, this can diminish the performance of the electric machine.

Therefore, among other things, cooling devices with a cooling fluid have been put forward with which the heat loss generated on the stator is dissipated by means of convection or conduction or else a combination thereof. In the simplest case, the entire electric machine is encapsulated in a housing and the cooling fluid flows around the stator and the rotor. In this context, churning losses occur at the rotating rotor so that, as is described in German patent application DE 101 22 425 A1, the cooling device, which is cooled by means of cooling fluid, is restricted to the stator. For this purpose, recesses such as flutes or grooves are provided next to each other along the stator in the housing, and they are closed off radially towards the inside by a metal sleeve as well as sealed vis-à-vis each other. The cooling medium is fed in and removed through these flutes from the outside. The production of such a cooling device is labor-intensive since an additional sleeve of a cooling jacket with external flutes has to be provided, or else the inner circumference of the housing has to be provided with such flutes.

As an alternative, a cooling jacket made of metal is inserted between the stator core and the housing, whereby the outer circumferential surface of the cooling jacket has recesses that, together with the housing, form cooling channels. The production and assembly of such cooling jackets is labor-intensive and, due to the surface roughness, small cavities that increase the heat transfer resistance are formed between the cooling jacket and the stator.

SUMMARY OF THE INVENTION

It is an object of the present invention to provide an electric machine with a simple and inexpensive configuration of a cooling device in an advantageous manner, and to put forward a method for its production. Moreover, a cooling device with an improved cooling effect is to be proposed.

The proposed electric machine comprises a housing and a stator accommodated therein as well as a rotor arranged radially inside the stator. In the stator, a soft-magnetic core and windings are provided in order to generate an electromagnetic field. The windings can consist of wires or of rods whose ends are connected to each other, preferably made of copper, and they have winding heads at their ends. At least the soft-magnetic core and advantageously also the winding heads are sealed vis-à-vis the housing radially towards the outside by means of at least one plastic body. The at least one plastic body can be made up of several parts of one or more types of plastic. Moreover, the plastic body can be made in one piece out of several plastics. The plastic body can be made by means of an injection-molding process, or else it can be an intermediate product created through the modality of material removal, or it can be a casting compound. Combined forms of these production processes are also possible. In an especially advantageous manner, an injection-molded plastic body can be injected directly onto the stator, for example, in that the stator serves as an insert part in an injection mold and the plastic body is joined to it by means of an injection-molding process. The cooling device is formed between the plastic body and the housing, and it has at least one cooling channel through which a cooling fluid, preferably water, flows. The at least one cooling channel is at least partially formed in the plastic body. Preferably, the cooling channel is created off-tool during an injection-molding process or during the curing of the casting compound. Advantageously, the walls between the coolant and the stator core as well as preferably also at least one winding head are configured to be thin. During the injection molding of or around the plastic body, small cavities between the stator and the cooling device are largely avoided. Together with the use of plastics that have been rendered highly conductive to heat by means of fillers, it is possible to achieve low heat transfer resistances between the heat-generating stator components and the coolant. In addition to the cooling device that uses fluid to cool the stator, an additional air or fluid cooling system can be provided for the rotor.

In order to form the at least one cooling channel, a recess that is radially open towards the outside such as a groove, a flute or the like can be provided on the outer circumference of the plastic body, and this recess is closed by means of a smooth inner circumferential surface of the housing. In this manner, the inner circumferential surface of the housing can be configured essentially planar, whereas the shaping part of the recess is provided on the outer circumference of the plastic body in a simple manner, so that there is no need for additional components to form the cooling device between the housing and the plastic body such as, for example, a casting compound. For this purpose, it is especially advantageous for the recess to be created and shaped when it is being cast together with the stator or with a soft-magnetic core and the winding heads. In particular, in order to improve the thermal conductivity of the cooling device, a prefabricated plastic body which has been imparted with high conductivity through additives and in which the recess has been made can be cast together with the casting compound. Such a separately prefabricated plastic body is preferably arranged close to the winding heads and it improves the heat flow to the coolant.

The cross section of the recess can be without undercuts, for example, it can be provided to be half-round, widened towards the outside conically or in a similar manner. Advantageously, during the injection molding that shapes the cooling channel, only very little extra effort is needed to create a wavy cooling channel base in the injection-molding tool. The contact surface between the cooling jacket and the coolant can thus be augmented in a simple manner. Therefore, this transfer resistance between the heat-conductive plastic and the coolant can also be reduced.

The recess can be configured around an axis of rotation of the rotor in a spiral shape on the outer circumference of the plastic body, whereby the distance between adjacent recess sections is selected to be sufficiently large that any fluid exchange on the interstices between inner circumferential surfaces and the interstices of the recess sections remains negligible. Particularly in case of high pressures of the coolant, a sealing interlayer can be provided on the contact surfaces between the plastic body and the housing. Such an interlayer advantageously consists of elastic material that differs from the material of the plastic body in terms of its properties, for example, it could be configured to be more elastic, and it is preferably joined to the plastic body in a two-component injection-molding process, so that a firm and tightly sealed connection is achieved between the plastic body and the housing.

The torque support of the stator vis-à-vis the housing is advantageously not effectuated via the plastic body but rather by means of "torque support elements", for instance, by means of a positive fit. In this manner, the plastic body can be made with a thin wall in a small installation space and with elastic layers.

If several cooling channels are provided which are arranged next to each other relative to the axis of rotation of the rotor, then multi-groove threads can be provided correspondingly, for example, two or more recesses arranged next to each other in a spiral shape. Furthermore, in order to jointly feed in and remove the coolant at the geometrically identical location, an inlet and outlet of the recess can be arranged on the same end face of the stator. Here, the recess preferably has a reversal point in one area of the opposite end face. Moreover, a cooling channel that is axially formed in two half-shells can be provided. In one half-shell, the coolant can be conveyed in one direction while in the other half-shell, the coolant can be conveyed back in the opposite direction. It goes without saying that additional advantageous layouts of the cooling channel—especially in order to form the connections—on the same side of the housing are also encompassed by the invention.

It can also be advantageous for the at least one recess to be sealed on the end face vis-à-vis the housing, for example, by means of a ring seal. For this purpose, the plastic body can be placed at a sufficient distance between the recess and an end face of the housing and/or, for example, with a ring-shaped blind nut having a ring seal between the housing and the recess in order to prevent cooling fluid from leaking into a rotor chamber. As an alternative, the cooling effect can be increased, especially in the case of compact electric machines, in that the cooling channel is widened on at least one end face. In order to seal the cooling device radially towards the inside, a ring seal such as an O-ring can be provided radially inside the cooling channel between the plastic body and the housing or between the stator and the housing.

The electric machine can be provided directly in a hybrid or purely electric motor-powered drive train of a motor vehicle as a drive motor and/or as a power generator.

In the proposed method for producing an electric machine described above, the at least one cooling channel consists of a recess made in the plastic body and of a smooth inner circumferential surface of the housing that seals the recess radially towards the outside. The housing can be made, for example, of aluminum or light-metal alloys by means of an extrusion or die-casting process, and it can be reworked by machining to form the inner circumferential surface. In this manner, by forming the inner circumferential surface as a smooth surface, the production is rendered particularly simple. In special cases, a housing or partial housing can be produced with an off-tool inner circumferential surface. For example, a metal sleeve with an off-tool inner circumferential surface can be firmly inserted into an unworked opening of the housing that is essentially unprocessed after the production procedure. For purposes of torque support, axially running flutes can be created on the circumferential surface of the soft-magnetic body into which torque support elements in the form of pins are inserted. The torque support elements are, in turn, anchored, for example, via a housing shield, by means of parts of the housing that create a positive fit.

In an appropriate method for producing the electric machine, the recess can be created through the modality of material removal in the plastic body that was made of an intermediate product, for example, by means of an injection-molding process or by machining. In an especially advantageous manner, the recess can be formed preferably off-tool during the production by means of a shaping tool used for the plastic body, for example, during an injection-molding or casting process.

The advantageous aspects of a simple configuration and an improved cooling performance are achieved according to the invention especially in that, by coupling casting with a cooling device, there is no need for a component that is complicated to produce, and recesses on the cooling device can be partially produced by means of an (injection) molding or casting process. The casting compound used here is configured so as to be highly heat-conductive. Directly during the shaping process, the casting compound forms a structure of recesses with cooling ribs in-between, which then dissipate the thermal losses when they come into direct contact with the cooling medium.

Another improvement of the heat dissipation, along with excellent cost efficiency, can be achieved by a combination of two or more thermally conductive plastics in a multi-stage shaping process. This can be, for example, in the form of an impregnation of the coil winding of the stator with a subsequent encapsulation by injection-molding or by multi-component injection-molding.

This ensures the direct electric insulation and mechanical fixation of the electric conductors of the coil winding by means of a plastic that is highly thermally conductive and electrically insulating. For this purpose, due to the requisite high flowability, preferably thermosetting plastics with high filling levels of metal oxides or nitrides such as, for example, aluminum oxide or boronitride, can be used, each individually or in a combination between 10% and 80%. The thermal connection to the cooling medium is established and the recesses and/or cooling ribs are created in a second step using another material. This material can be modified by means of inexpensive fillers that are thermally highly conductive but no longer necessarily electrically insulating. This material can have a thermosetting matrix as well as a thermoplastic matrix and it preferably contains a high level of filler comprising thermally and electrically conductive additives, for example, metal powders such as aluminum powder or graphite powder in a fraction ranging from 10% to 80%.

The winding heads that protrude from the soft-magnetic core or from a laminated core are preferably already shaped before being encapsulated by injection-molding with the thermally highly conductive final casting compound, thereby acquiring defined dimensions. Preferably, the winding head is shaped immediately after the insulating plastic has been inserted, whereby its curing contributes to the stabilization of the shape of the winding head. In an advantageous manner, an interlayer that compensates for mechanical stresses can be applied in a thin layer onto the thus shaped winding heads and onto the soft-magnetic core. This is preferably done through immersion into an electrostatically charged powder bath or by spraying. In this process, the stator is affixed on the air gap surface by an elastic cylinder, so that the air gap surface remains free of contaminations, especially plastic.

The interlayer that compensates for stresses is preferably very thin, for example, between 0.1 mm and 0.3 mm, and it preferably likewise contains thermally conductive fillers.

According to an advantageous embodiment, the surface of the recesses in the at least one plastic body is created directly during the casting process in order to form the cooling device, or else directly in the casting material by means of a machining production process. Here, the casting material has improved thermal conductivity properties as well as appropriate temperature and media resistance properties. In order to ensure a permanent bond between the casting material and the coil bodies with the windings, with the soft-magnetic core and, if applicable, with other components, adapted length-temperature coefficients as well as optionally interlayers that compensate for stresses are provided. Moreover, the casting process can form only part of the cross section of the recesses, thereby advantageously creating a tight connection for the cooling medium vis-à-vis a housing part that closes off the cross section of the recesses. In order to ensure a reliable seal, the materials selected are preferably those that are adapted to each other in terms of influences that prescribe their dimensions and tolerances, such as swelling and temperature changes. As an alternative, a seal between the housing and the plastic body can be provided by means of additional sealing rings. The forces can be supported either by a press fit of the cast jacket in the housing or else by separate fastening elements that are specially shaped or provided there.

A first plastic compound located in the groove space inside the winding heads preferably has electrically insulating and thermally conductive fillers.

A second plastic compound with electrically insulating and thermally conductive fillers can be provided around the outer stator core surface and around the winding heads. The advantage of electrically insulating and thermally conductive modified plastics is the fact that they have higher thermal conductivity in comparison to electrically insulating materials, along with lower filler costs.

An advantageously configured embodiment of the proposed cooling device simultaneously combines the aspects of improving the cooling performance and optimizing the costs. For this purpose, the following alternative or additional embodiment features can be advantageous:

The distance between the cooling medium and the soft-magnetic core or the winding heads can be designed to be considerably smaller than in the case of conventional cooling jackets, as explained above for the state of the art. In injection-molding processes, much thinner walls can be made than in the case of a metal cooling channel that is created separately by machining. On the one hand, these thinner walls reduce the thermal resistance and, on the other hand, they require less installation space for the plastic body, or else, within the available installation space, the stator can be configured to be larger and thus more powerful.

When the plastic body is injection-molded directly in the form of a plastic jacket, full-surface contact with the rough circumferential surface of the soft-magnetic core can be achieved, so that the heat resistance between the stator and the plastic body can be kept low. In contrast, in the case of an interference fit according to the state of the art, small cavities between the cooling jacket and the stator core can increase the heat resistance.

When an advantageous cooling channel shape is created by means of an injection-molding process, then, with just a bit of extra work involving the injection mold, a complex structure can be made that has a high surface, for example, a wavy configuration. The contact surface between the cooling jacket and the coolant can thus be augmented in a simple manner. Consequently, this transfer resistance between the heat-conductive plastic and the coolant can also be reduced.

BRIEF DESCRIPTION OF THE DRAWING

The invention is explained in greater detail on the basis of a single FIGURE. This FIGURE shows an embodiment of an electric machine in a lengthwise section around the axis of rotation of a rotor of the electric machine. Here, only the upper part of the electric machine—relative to the axis of rotation—is shown.

DETAILED DESCRIPTION

The single FIGURE shows the electric machine 1 with the housing 2 and the stator 3 that is firmly accommodated in it and, in a partial sectional view, with the rotor 4 that can be rotated around the axis of rotation x. The stator is made up of the soft-magnetic core 5 and of windings with winding heads 6 accommodated in said core 5. The plastic body 7 seals the stator 3 vis-à-vis the housing 2. The friction clutch 9 that is arranged axially inside the rotor 4 is located between the drive shaft 8 and the rotor 4. An interlayer 22 may be provided on the contact surfaces between the soft-magnetic core 5 the plastic body 7.

The cooling device 10 is located between the housing 2 and the stator 3. This cooling device 10 is formed by the cooling channel 12 which is created as a recess 11 in the plastic body and in which a coolant is conveyed that dissipates the thermal heat loss from the stator. The recess 11 is arranged in a spiral shape along the axis of rotation x on the outer circumference of the plastic body 7 and it essentially covers the entire axial width of the stator 3. For purposes of simplifying the creation of the recess 11 in the plastic body 7, for example, through the modality of material removal, during an injection-molding process or during the casting of the stator 3, this recess 11 is formed so as to be radially open on the outside and subsequently closed during the joining of the stator 3 in the housing 2 by means of the inner circumferential surface 13 of the opening 14 that was provided for the insertion of the stator 3 in the housing 2. The inner circumferential surface 13 is appropriately smooth in order to create an adequate seal of the contact surface 21 of the plastic body 7 between two sections of the recess 11, that is to say, it has a very slight rough depth. An interlayer to improve the sealing properties can be provided on the contact surfaces 21 and/or on the inner circumferential surface 13.

In the embodiment shown, the two connections 15, 16 for feeding in and removing the cooling medium are arranged next to each other in the area of the end face 17 of the plastic body 7, so that the recess 11 has the reversal point at the opposite end face 18. The end face 18 of the plastic body 7 seals the cooling device 10 vis-à-vis the stop 20 of the housing 2. The embodiment presented shows an electric machine 1 of a hybrid drive and it is intended for installation between the internal combustion engine and the transmission, so that an open end face 17 is sealed against a housing of the internal combustion engine or of the transmission.

LIST OF REFERENCE NUMERALS

1 electric machine
2 housing
3 stator
4 rotor
5 soft-magnetic core
6 winding heads
7 plastic body
8 drive shaft
9 friction clutch
10 cooling device
11 recess
12 cooling channel
13 inner circumferential surface
14 opening
15 connection
16 connection
17 end face
18 end face
19 reversal point
20 stop
21 contact surface
X axis of rotation

What is claimed is:

1. An electric machine comprising:
a housing;
a stator accommodated in the housing, the stator including windings and a soft-magnetic core;
a rotor arranged radially inside the stator;
a cooling device between the stator and the housing, the cooling device having at least one recess conveying a cooling medium; and
at least one plastic body radially surrounding of the soft-magnetic core of the stator to create the at least one recess extending at least radially partially into an outer circumferential surface of the at least one plastic body;
wherein the windings have winding heads, the at least one plastic body being made of cast material for casting the soft-magnetic core and the winding heads or made of a machined or injection-molded material, the at least one plastic body including at least an electrically insulating and heat conductive first plastic around the stator, and an electrically conductive and heat conductive second plastic with the at least one recess formed therein.

2. The electric machine as recited in claim 1 wherein an interlayer is provided on contact surfaces between the soft-magnetic core and the at least one plastic body.

3. The electric machine as recited in claim 1 wherein the first plastic includes heat conductive metal oxides or nitrides as fillers contained in the first plastic.

4. The electric machine as recited in claim 1 wherein the second plastic includes heat conductive metal or graphite powders as fillers.

5. The electric machine as recited in claim 1 wherein at least one recess is provided around an axis of rotation of the rotor in the plastic body.

6. The electric machine as recited in claim 1 wherein an inlet and outlet of the at least one recess are arranged on a same end face of the plastic body, and the at least one recess has a reversal point on an opposite end face.

7. The electric machine as recited in claim 1 wherein the at least one recess is widened on at least one end face of the plastic body.

8. A method for producing the electric machine as recited in claim 1 comprising: forming the cooling device by making the at least one recess at least in the outer circumference of the at least one plastic body and closing off the at least one recess radially toward the inside with a smooth inner circumferential surface of the housing.

\* \* \* \* \*